March 8, 1938.  I. L. HOFFER  2,110,152
TOOL
Filed Jan. 27, 1937
Fig. 1.
Fig. 2.
Fig. 3.
Fig. 4.
Fig. 5.
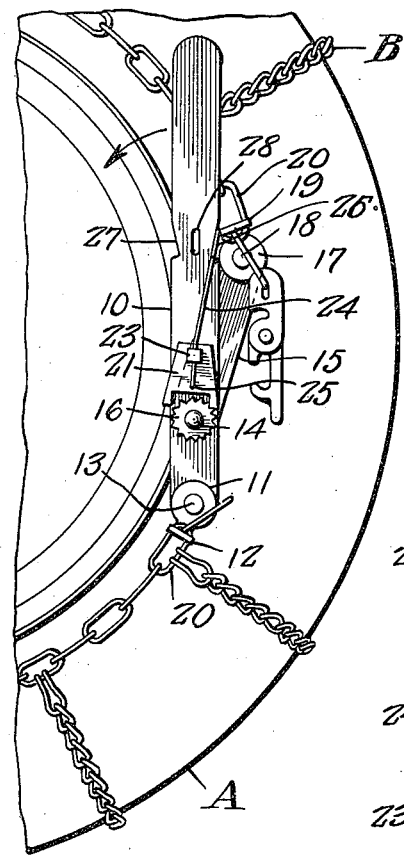
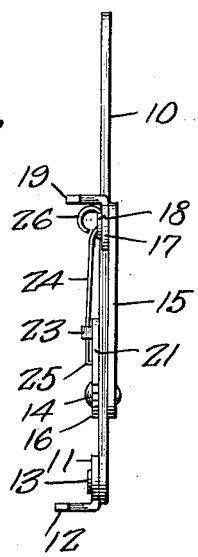
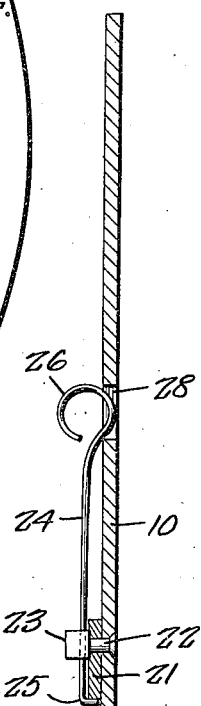
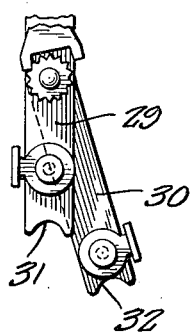
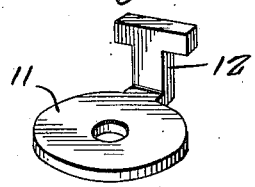
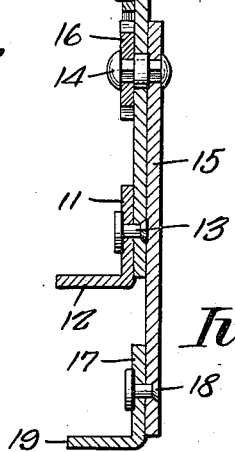
Ivan L. Hoffer,
INVENTOR
BY Victor J. Evans & Co.
ATTORNEYS
WITNESS Patented Mar. 8, 1938

2,110,152

UNITED STATES PATENT OFFICE 2,110,152

TOOL

Ivan L. Hoffer, Seattle, Wash.

Application January 27, 1937, Serial No. 122,652

5 Claims. (Cl. 152—14)

The invention relates to a tool for tightening antiskid chains and more especially to a combination tool for spreading tire casings and tightening antiskid chains.

The primary object of the invention is the provision of a tool of this character, wherein the construction thereof enables the tightening of antiskid chains upon tires for the easy application or removal of the same and also for the spreading of tire casings to enable repairs thereto at the inside of the same, as, for example, in placing patches, shoes or the like therein.

Another object of the invention is the provision of a tool of this character, wherein the same on adjustment thereof can be held in such position without the assistance of the operator so that antiskid chains may be retained in a tightened position by the tool or the casing of a tire spread thus relieving the operator from the duty of holding the tool in adjusted position.

A further object of the invention is the provision of a tool of this character, which is simple in construction, thoroughly reliable and efficient in operation, readily and easily handled, relieving the operator of excessive strain and energy in the manipulation thereof, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary side elevation of a tired vehicle wheel showing the tool constructed in accordance with the invention and applied to an antiskid chain for the tightening thereof.

Figure 2 is an edge elevation of the tool detached.

Figure 3 is a vertical longitudinal sectional view through the tool and shown on an enlarged scale.

Figure 4 is a perspective view of an attaching terminal embodied in the tool.

Figure 5 is a fragmentary elevation showing a slight modification of tool.

Similar reference characters indicate corresponding parts throughout the several views in the drawing.

Referring to the drawing in detail, particularly Figures 1 to 4, A designates generally a portion of a tire of a vehicle wheel, being of the pneumatic type. B designates an antiskid chain applied to such tire A, the chain being of standard construction and both the tire and said chain are shown merely for illustrating the use of the tool for the tightening of the chain upon said tire.

The tool comprises a main flat bar 10 constituting an operating lever having at one end a disk-like attaching terminal piece 11 formed with a substantially T-shaped ear 12 out-turned at right angles thereto, the piece being centrally pivoted at 13 to the said bar so that this piece 11 is rotatable relative to the said bar.

Loosely swiveled in the bar 10 a determined distance removed from the pivot 13 is a pivot stud 14 which is projected beyond opposite faces of the bar and is made fast at one side of said bar in the inner end of a flat bar-like arm 15 and at the other face of the said bar 10 is fixed centrally in a ratchet gear 16. The arm 15 at its outer end carries a disk-like attaching terminal piece 17 which is pivoted at 18 to the arm 15 and is formed with a substantially T-shaped ear 19, this piece being identical or similar to the piece 11. The ears 12 and 19 are engageable in links 20 of the antiskid chain B at or near the ends of said chain. On the engagement of the ears 12 and 19 of the terminal pieces with the chain B by manipulating the lever constituted by the bar 10 in the direction of the arrow as shown in Figure 1 of the drawing the ends of said chain can be drawn toward each other for the tightening of the chain upon the tire A so that the ends of said chain can be conveniently and easily fastened in the usual well known manner.

On the bar 10 is a double acting ratchet pawl 21 pivoted at 22 thereto and this pawl under reverse action thereof can lock the ratchet gear 16 and thus hold the arm 15 at an angular adjusted position with respect to the bar 10. Trained through the head 23 of the pivot 22 is a wire spring 24 which at the hook end 25 is secured to the pawl 21 at the longitudinal center thereof and at one side of the pivot 22, the wire spring 24 at the other end thereof and at the opposite side of the pivot 22 is formed with a loop-like latching head 26 which is adapted to engage in keeper notches 27 in opposite side edges of the bar 10 or in a keeper slot 28 between these notches and provided in said bar 10 at the longitudinal center thereof. The head 26 when engaging the slot 28 holds the pawl 21 in a neutral position and out of ratchet engagement with the gear 16. When the head 26 is engaged in either of the notches 27, ratchet action will be set up between the pawl 21 and the gear 16 but locking the arm 15 against swinging movement in one direction and thus holding the tool adjusted when tightening the chain B upon the tire A without the aid of an operator. The swinging of the lever 10 moves the same relative to the arm 15 and when said lever is thrown in the direction of the arrows in Figure 1 of the drawing, the chain B will become tightened on the tire A for the fastening of the ends of the chain in a taut condition upon said tire. To fasten the tool in the adjusted position the pawl 21 with the wire spring 24 acting thereon will be thrown by the latter when engaging in one of the notches 27 and tensioned by this wire spring 24 when its head 26 is so engaged with the notch so that ratchet action may be had between the pawl 21 and the gear 16 yet the arm 15 will be latched against movement in one direction with respect to the said lever 10. In this manner the operator is relieved from holding the tool in adjusted position when the chain B has become tightened through the use of said tool and thus making it easy to fasten the ends of the chain together.

In Figure 5 of the drawing there is shown a slight modification wherein the ends of the lever 29 and the arm 30 next to the attaching terminals 31 thereon are provided with half circular notches 32 to form seats for the bead edges of the tire casing A when the tool is used for the spreading of such casing for repair work interiorly of the same.

It is, of course, understood that changes, variations and modifications may be made in the invention as come properly within the scope of the appended claims without departing from the spirit of the invention or sacrificing any of its advantages.

What is claimed is:

1. A tool of the character described comprising a lever, an arm swingingly connected with said lever, a ratchet gear movable with said arm, a double reverse acting ratchet pawl pivoted to said lever and coacting with the gear, a spring member connected with the pawl for reversely tensioning the same and for latching it in neutral non-ratchet acting position, attaching means carried by the lever and arm, T-shaped ears formed with said attaching means and at right angles thereto, the arm and lever next to the attaching means being formed with notches providing seats, and pivots swingingly connecting the attaching means with said lever and arm, respectively.

2. A tool of the character described comprising a lever, an arm swingingly connected with said lever, a ratchet gear movable with said arm, a double reverse acting ratchet pawl pivoted to said lever and coacting with the gear, a spring member connected with the pawl for reversely tensioning the same and for latching it in neutral non-ratchet acting position, attaching means carried by the lever and arm, T-shaped ears formed with said attaching means and at right angles thereto, the arm and lever next to the attaching means being formed with notches providing seats, circular elements rotatably pivoted to the said members, and T-shaped heads bent outwardly from the said elements and eccentrically disposed to the axes of rotation thereof.

3. A tool of the character described comprising a lever, an arm swingingly connected with said lever, a ratchet gear movable with said arm, a double reverse acting ratchet pawl pivoted to said lever and coacting with the gear, a spring member connected with the pawl for reversely tensioning the same and for latching it in neutral non-ratchet acting position, attaching means carried by the lever and arm, T-shaped ears formed with said attaching means and at right angles thereto, the arm and lever next to the attaching means being formed with notches providing seats, circular elements rotatably pivoted to the said members, T-shaped heads bent outwardly from the said elements and eccentrically disposed to the axes of rotation thereof, and an extension on one of the members and forming leverage for the same.

4. A tool of the character described comprising pivotally connected members, circular elements rotatably pivoted to the said members, and T-shaped heads bent outwardly from the said elements and concentrically disposed to the axes of rotation thereof.

5. A tool of the character described comprising pivotally connected members, attaching elements rotatably carried by said members, and heads extending outwardly from said elements at substantially right angles thereto and disposed concentric to the axes of rotation of the same.

IVAN L. HOFFER.